United States Patent [19]

Schulman

[11] Patent Number: 5,600,366
[45] Date of Patent: Feb. 4, 1997

[54] METHODS AND APPARATUS FOR DIGITAL ADVERTISEMENT INSERTION IN VIDEO PROGRAMMING

[75] Inventor: Martin A. Schulman, Herndon, Va.

[73] Assignee: NPB Partners, Ltd., Reston, Va.

[21] Appl. No.: 408,253

[22] Filed: Mar. 22, 1995

[51] Int. Cl.⁶ ........................................ H04N 7/10
[52] U.S. Cl. ............................................... 348/9
[58] Field of Search .................... 348/460, 461, 348/468, 465, 467, 478, 473, 722, 482, 720, 721, 715, 718, 719, 552, 6, 9

[56] References Cited

U.S. PATENT DOCUMENTS

| | | | |
|---|---|---|---|
| 4,230,990 | 10/1980 | Lert, Jr. et al. | 348/4 |
| 4,814,883 | 3/1989 | Perine et al. | 348/461 |
| 4,974,085 | 11/1990 | Campbell et al. | 348/460 |
| 5,200,825 | 4/1993 | Perine | 348/722 |
| 5,216,515 | 6/1993 | Steele et al. | 358/335 |
| 5,283,639 | 2/1994 | Esch et al. | 348/906 |
| 5,412,416 | 5/1995 | Nemirofsky | 348/10 |
| 5,424,770 | 6/1995 | Schmelzer et al. | 348/9 |

*Primary Examiner*—John K. Peng
*Assistant Examiner*—Nathan J. Flynn
*Attorney, Agent, or Firm*—Lowe, Price, LeBlanc & Becker

[57] ABSTRACT

Digital ad insertion methods and apparatus permit timely and correct switchovers from network programming to local advertising in ways which occur smoothly without a disruption in perception to the viewer. Switchovers occur at packet or frame boundaries and are designed to occur upon detection of idle information from a network source.

25 Claims, 9 Drawing Sheets

METHODS AND APPARATUS FOR DIGITAL ADVERTISEMENT INSERTION IN VIDEO PROGRAMMING

TECHNICAL FIELD

This invention is related to broadcast video and more particularly to the insertion of advertising in video distribution systems.

BACKGROUND ART

Broadcast video sources (i.e. TV networks, special interest channels, etc.) schedule their air time with two types of information: "programming" for the purpose of informing or entertaining, and "avails" for the purpose of advertising. The avails may occupy roughly 20–25% of the total transmitting time, and are usually divided into smaller intervals of 15, 30, or 60 seconds. While the video sources usually know what programming is to be sent during a specific interval (i.e. Seinfeld, Thursdays at 9:00 pm), and usually also know the number and timing of avails, there are some types of events (i.e. sporting, live broadcasts) where these are not precisely known.

Information about avails is provided to the sales department of local stations which sell the commercial time. The sales department may have many individuals trying to sell the same avail to different prospective clients, once at the national level, and multiple times for each local distribution system (i.e. cable head-end or local broadcast station.) If an avail has not been sold locally, the national spot is shown.

Once sold, the content must be produced and provided to the operator of the distribution system. The content must be made available to the local distribution feed during each time it is scheduled.

The timing of the cutover for a single commercial is illustrated in FIG. 1. Approximately 5 seconds before the beginning of the commercial break, a pre-roll cue is issued over a signaling channel. At this time, a video playback device begins to synchronize its output with that of the network; a latency of several seconds is normal for analog playback decks. A start cue arrives at the beginning of the commercial, indicating that the network has faded to black and a switch should select the local source. Note that the network feed may continue to supply national advertising which is not sent to the local distribution system. At the conclusion of the ad, a return cue switches the video source back to the network, and the local playback deck stops briefly afterward.

Commercials and breaks are not always exact multiples of 30 seconds. It is therefore possible for the local ad to end slightly before or after the network break. It is up to the local system to establish a policy whether to return immediately upon receipt of the cue, or whether to allow the local commercial to air in its entirety.

Commercial breaks typically allow more than one local ad. Depending on the number of ads sold for a given time slot, the system may return to the network feed early—after the local spots have been played—or it may continue to run local commercials for the duration of the break. The video playback device not only must often serve more than one ad, but often may also be shared among multiple channels. The server must therefore have enough capacity to hold all local ads currently airing, and must be able to access a predefined set of ads for an upcoming commercial break within a few seconds of the first cue.

A typical analog ad insertion system of the prior art is illustrated in FIG. 2. The broadcast source, 200, for example, is an RF channel analog network feed received from a satellite, which includes cue tones modulated on a side carrier. The receiver/demultiplexer 210 demodulates the analog video from the RF carrier, and demodulates the signaling tones from the side carrier and generates control information such as contact closures which are passed to an analog matrix switch 220. The matrix switch is an intelligent device which controls an external tape library/robot system and which knows which commercials are to be played during a given break. Commercial systems utilize the same switch and tape library to support multiple channels.

As discussed above, the preroll cue 240 tone is detected in the matrix switch prepared for the start of the advertisement. When the start cue is detected (250), the analog output 230 is switched from the network feed originating through receiver/demultiplexer 210 to the local analog matrix switch where the advertisement is provided. Line 260 between the receiver/demultiplexer and the local analog matrix switch indicates that the two devices are synchronized so that when switch 270 is activated to switch the programming source, the transition can be made without a loss of synchronization at the receiver.

For use with a digital video dial tone network, the output of the analog system 230 must be encoded by a real-time encoder (not shown). There is a slight possibility that a commercial would suffer from unpredicted distortions during some playbacks through the real-time encoder. Of greater concern is the constant wear on tapes and tape players which require constant human maintenance to avoid degraded quality.

FIG. 3 illustrates an end-to-end view of a video distribution system over an analog network of the prior art. Video programming is provided by a digital video-on-demand server 300, the output of which, because the network is analog, is converted to analog in digital-to-analog converter (DAC) 310. The digital output of the digital VOD server can be, for example, in MPEG-2 format over ATM. The output of DAC 310 is fed to analog network 330 which also receives an analog feed 320 from, for example, satellite receiving equipment. The output of analog network 330 is fed to circuitry, such as shown in FIG. 2, where local analog advertising is selectively inserted in response to cue tones. The output of the FIG. 2 circuitry is fed to analog digital converter, (ADC) 350 which converts back to the digital format for display on a digital display device 360.

Since modern production studios are utilized in the production of advertisements, the ads are created in digital form. The multiple conversions from digital to analog and back to digital are undesirable. Such conversions can affect reliability and image quality. One cannot merely relocate block 340 to the left of the DAC 310 because MPEG and ATM streams cannot be switched at arbitrary points.

FIG. 4 illustrates a variation on the previous approach. Analog cable operators have recognized the tape maintenance drawbacks, so some vendors have begun substituting digital video servers 400 with analog outputs for the tape libraries in FIG. 2. While the commercials reside on the disks in digital form, a decoder 410 is employed which provides a conventional analog output.

Digital servers respond more quickly to cue signals, allowing greater flexibility for unanticipated avails. However, because the analog switch output must be fed to the digital network input, commercials will received two concatenated lossy encoding/decoding operations.

The transmission of programming, in particular, video programming where wide bandwidth is required, has been known to include a variety of compression techniques. Modern decoders of compressed video information will adapt their operating modes in dependence upon the properties of the incoming signal. Video programming is often distributed in multiplexed format which requires that either the decoder or an associated demultiplexer be aware of where in the multiplexed stream particular programs are located.

One of the widely accepted standards for the distribution of video programming is that promulgated by the Organisation Internationale de Normalisation (International Organization for Standardization) under Standard ISO/IEC JTC1/SC29/WG11 entitled "Coding of Moving Pictures and Associated Audio". The particular working group responsible for that standardization effort is also known as the Motion Picture Experts Group.

MPEG compression and decompression standards have been evolving. The current advanced version is generally known as MPEG-2. The MPEG-2 standard is hereby incorporated by reference in its entirety. In the language of the MPEG-2 standard, a "program" is comprised of typically a source of video and a source of audio which share a common time base. One or more elementary digital streams (e.g. video or audio), as well as other data, are combined into single or multiple streams which are suitable for storage or transmission. System coding follows the syntactical and semantic rules imposed by the MPEG-2 specification and provides information to enable synchronized decoding without either overflow or underflow of decoder buffers over a wide range of retrieval or receipt conditions.

Under the MPEG-2 standard, an incoming individual video signal and related audio signal are encoded and packetized into a respective Video Packetized Elementary Stream (PES) and Audio Packetized Elementary Stream. The video and audio PES from one or more programs are combined into a transport stream for transmission or storage.

The transport stream is designed for use in environments where errors are likely, such as storage or transmission in lossy or noisy media. Transport stream packets are 188 bytes in length. Transport stream packets are generally divided into two sections. The first section constitutes header information and the second constitutes payload. Header information includes, inter alia, a synchronization byte, transport scrambling control and a thirteen bit program identification (PID) indication. PID value 0 is reserved as an indication that the packet includes program association table data. PID value 1 is reserved for conditional access such as encryption. PID value 0x1FFF is reserved for administrative (no-op) packets utilized for synchronizing the link. Other program identification numbers are utilized to identify transport packets with the program source from which they originate.

FIG. 5 depicts a transport stream utilizing the MPEG-2 standard. As indicated above, each transport packet in the transport stream carries a program identification number (PID). PID 0 carries program association table information. As illustrated in FIG. 5, a program association table maps a particular program source with the location of the PID associated with a program map related to that source. Thus, the program association table defines the location of program maps for each source of programming in the transport stream. The program map for CBS is found in PID 132; the program map for NBC is found in PID 87 and so forth.

The program map for CBS illustrated in FIG. 5 as that associated with PID 132 identifies the PID numbers for the packetized elementary streams (PES) for the video and audio channels associated with the program. One should note at this time that more than two PID's may be associated with a program. For example, there could be a data channel associated with the program which would include data for closed captioning for the hearing impaired. There could be a number of audio elementary streams for, for example, respective different languages. Thus the programming map provides some flexibility beyond that required for merely associating a single video and audio elementary streams.

Once the program map is known, the program decoder can be set to extract the desired elementary streams (e.g PID 56 in FIG. 5 and PID 74 shown in FIG. 5) for decoding and presentation. Transport packets of PID=56 represents the video elementary stream associated with CBS' MPEG video system. Within CBS' video elementary stream are video sequence headers which define things like frame rate, resolution, and the coordinates on the screen where display of the image should begin. Such coordinates are useful, for example, in defining pictures within a picture when multiple pictures are superimposed. After the video header sequence, the normal video syntax occurs which, in the case of MPEG, includes the normal frames associated with video compression such as I frames and B frames used in MPEG.

The elementary stream with PID=74 is the audio stream associated with the video shown in transport packets with PID=56 as defined in program map at PID=132.

A typical MPEG-2 transport demultiplexer and decoder is shown in FIG. 6. The data link specific interface 610 converts the incoming data link format (e.g. optical fiber encoded data) to a form (e.g. electrical) for demultiplexing and decoding. Transport stream demultiplexer 620 monitors the PID's of the incoming transport stream packets to identify those selected for decoding and routes those to respective video (630) and audio (640) decoders. Since the video and audio associated with the same program are derived from a common clock, clock control 650 drives both decoders. Note that the transport stream demultiplexer includes functionality, such as that described in connection with the description of the transport stream of FIG. 1, necessary to identify the particular PID's needed to extract information from the transport stream to present the desired program to the user.

The Motion Picture Experts Group (MPEG) is believed to be working on additional standards which may be implemented in the fully digital network environment. As of now, however, there are no products available to implement ad insertion in fully digital environment.

There are a number of problems with the prior art. Analog recorders are subject to serious wear and tear which results in reduced reliability. In addition, analog recorders do not match the digital end devices and the digital production facilities used to create advertisements for insertion in programming to be delivered to an end user. In addition, the spin up latency of analog recorders is slow. Excessive digital-to-analog followed by analog-to-digital conversion results in a degradation of image quality from the original.

Even in a fully digital system as currently implementable, when attempting to switch programming from one source to another, the switching tends to introduce interference, to cause loss of synchronization, to cause excessive retransmissions, or to freeze the decoder by switching in the middle of a packet or in the middle of a frame. These result in error conditions in the decoder and/or in unpredictable screen displays.

Further, in the prior art, there is generally one device per network feed. Some network feed ad insertion techniques of the prior art do not provide a smooth transition from the network feed to the advertisements and back.

Accordingly, one advantage of the invention is avoiding the problems of the prior art by providing digital ad insertion techniques which permit a switch from one program source to another smoothly without excessive analog to digital conversion and back and without the wear and tear of analog recorders and their accompanying slow spin up latency.

Another advantage of the invention is provision of digital ad insertion in which switching occurs predictably at the end of packets and frames so that undesired error states are not encountered.

Another advantage of the invention is in the use of one set of hardware to service multiple lines and to provide correct and smooth transition from network feeds to advertisement sources without the difficulties of the prior art.

Another advantage of the invention lies in the implementation in a smart communications interface board with simple software enhancements.

DISCLOSURE OF THE INVENTION

These and other objects of the invention are achieved by providing methods and apparatus for inserting local video programming in place of externally supplied programming. Externally supplied programming contains embedded tone cues including a pre-roll cue and a roll cue, which are detected prior to converting the analog video information to digital video information. A digital video player is activated in response to one of said tone cues preparatory to initiating playback. Playback is initiated from said recorder in response to detecting an idle condition from said digital video information. Idle condition is detected by detecting idle MPEG packets or by detecting a series of black pixels. An output buffer may be pre-filled in response to one of said tone cues and read out in response to said detecting an idle condition. In a time division multiplex system, at least one time slot is monitored to determine when an idle condition exists. In a MPEG or ATM system, packet headers are monitored for particular source or destination addresses. Playback begins at a point in the video frame which is the same as the point at which the information from the externally supplied programming left off. Typically, this will be a frame boundary or a packet boundary.

The invention is also directed to apparatus for inserting local video programming in place of externally supplied programming which receives externally supplied programming from a plurality of sources. Each source provides programming including analog video information and embedded tone cues. The analog video information is converted to digital video information. A memory stores a plurality of local programs. Each of said sources is monitored to detect one or more tone cues. In response to one tone cue from a source, the memory is prepared for playback of one or more local programs which are to be substituted for said externally supplied programming from that source. Playback from said memory of respective one or more of said local programs to be substituted for said externally supplied programming is initiated by detecting an idle condition from said digital video information from said source. A plurality of buffers smooth the transition to the local programs replacing externally supplied programming from individual sources.

A plurality of cue tone protocols are serviced which can be unique to each of the plurality of sources (i.e. different networks use different tone protocols).

The invention is also directed to a method for inserting local video programming in place of externally supplied programming by receiving externally supplied programming comprising analog video information and embedded tone cues (including a pre-roll cue and a roll cue), detecting said tone cues and converting the analog video information to digital video information; activating a video recorder in response to one of said tone cues preparatory to initiating playback; and initiating playback from said recorder in response to detecting an idle condition from said digital video information. An estimated time from roll cue detection to end of a current frame or current packet is calculated and a buffer pre-filled with an amount of data from said recorder. Data from said buffer is read out at said estimated time.

The invention is also directed to a method for inserting externally supplied programming in place of local video programming by receiving local digital video programming and providing it to a user, receiving externally supplied analog video programming and embedded tone cues including a return to network cue, detecting said return to network cue, converting said analog video information to digital video information upon receipt of said return to network cue and terminating operation of a video recorder in response to said return to network cue.

The invention is also directed to a method for inserting local video programming in place of externally supplied programming by receiving externally supplied programming from a plurality of sources, each source providing programming comprising analog video information and embedded tone cues, and for converting the analog video information to digital video information; providing a memory for storing a plurality of local programs; monitoring each of said sources to detect one or more tone cues for preparing said memory for playback of respective one or more of said local programs to be substituted for said externally supplied programming; and initiating playback from said memory of respective one or more of said local programs to be substituted for said externally supplied programming from a source when a respective source is determined to be idle.

The invention is also directed to a method of facilitating smooth transitions from a source of analog video information to a digital source of local information, by converting analog video information to digital and attaching one or more all-black frames at the beginning of said analog video information.

The invention is also directed to a method of facilitating smooth transitions from digital source of local information to a source of analog video information by attaching one or more all-black frames at the end of said local information.

Still other objects and advantages of the present invention will become readily apparent to those skilled in the art from the following detailed description, wherein only the preferred embodiment of the invention is shown and described, simply by way of illustrations of the best mode contemplated of carrying out the invention. As will be realized, the invention is capable of other and different embodiments, and that several details are capable of modifications in various obvious respects, all without departing from the invention. Accordingly, the drawings and description are to be regarded as illustrative in nature, and not as restrictive.

BEST MODE FOR CARRYING OUT THE INVENTION

Figure 1:
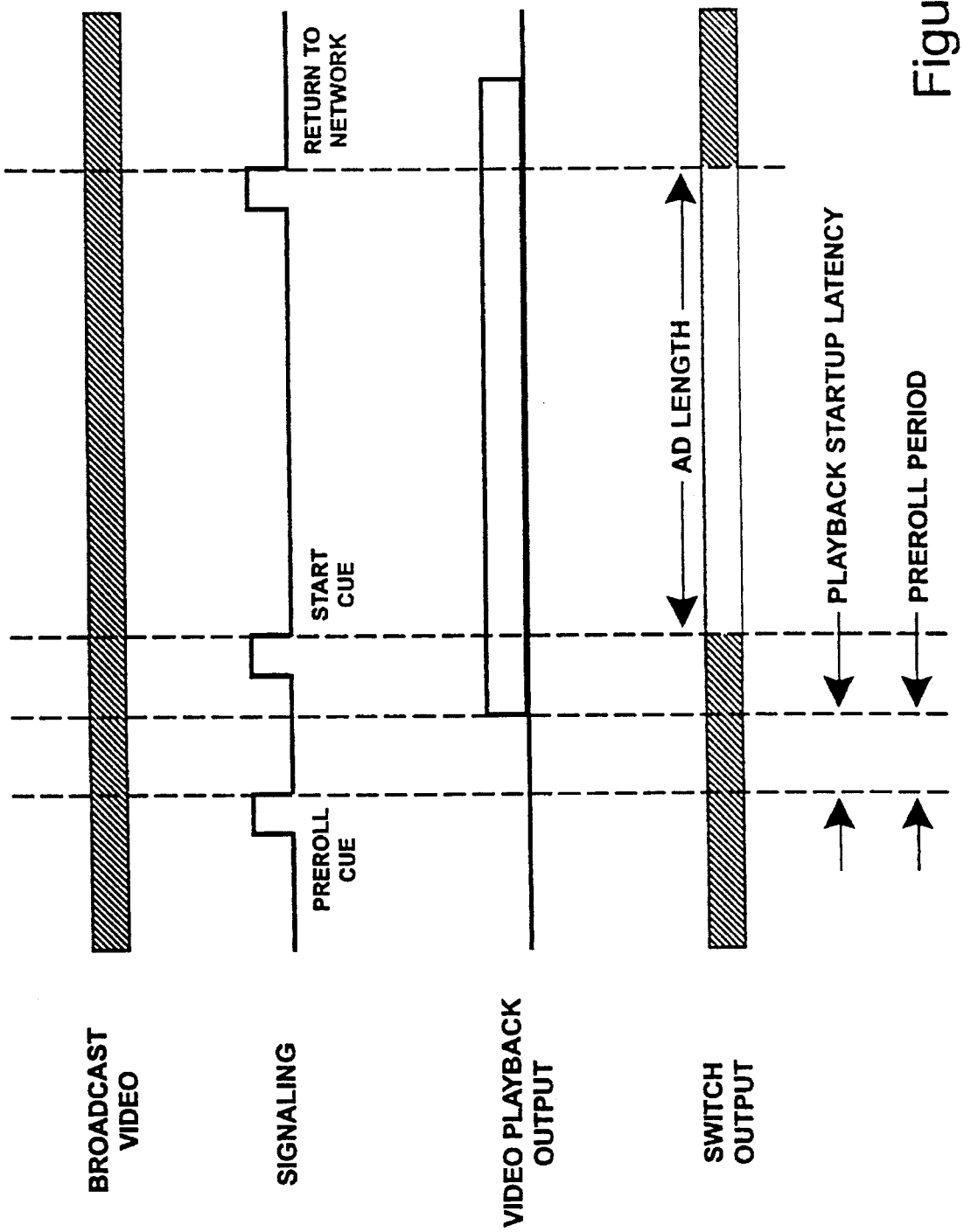
FIG. 1 is a timing diagram showing how ad insertion is cued by the network.
Figure 2:
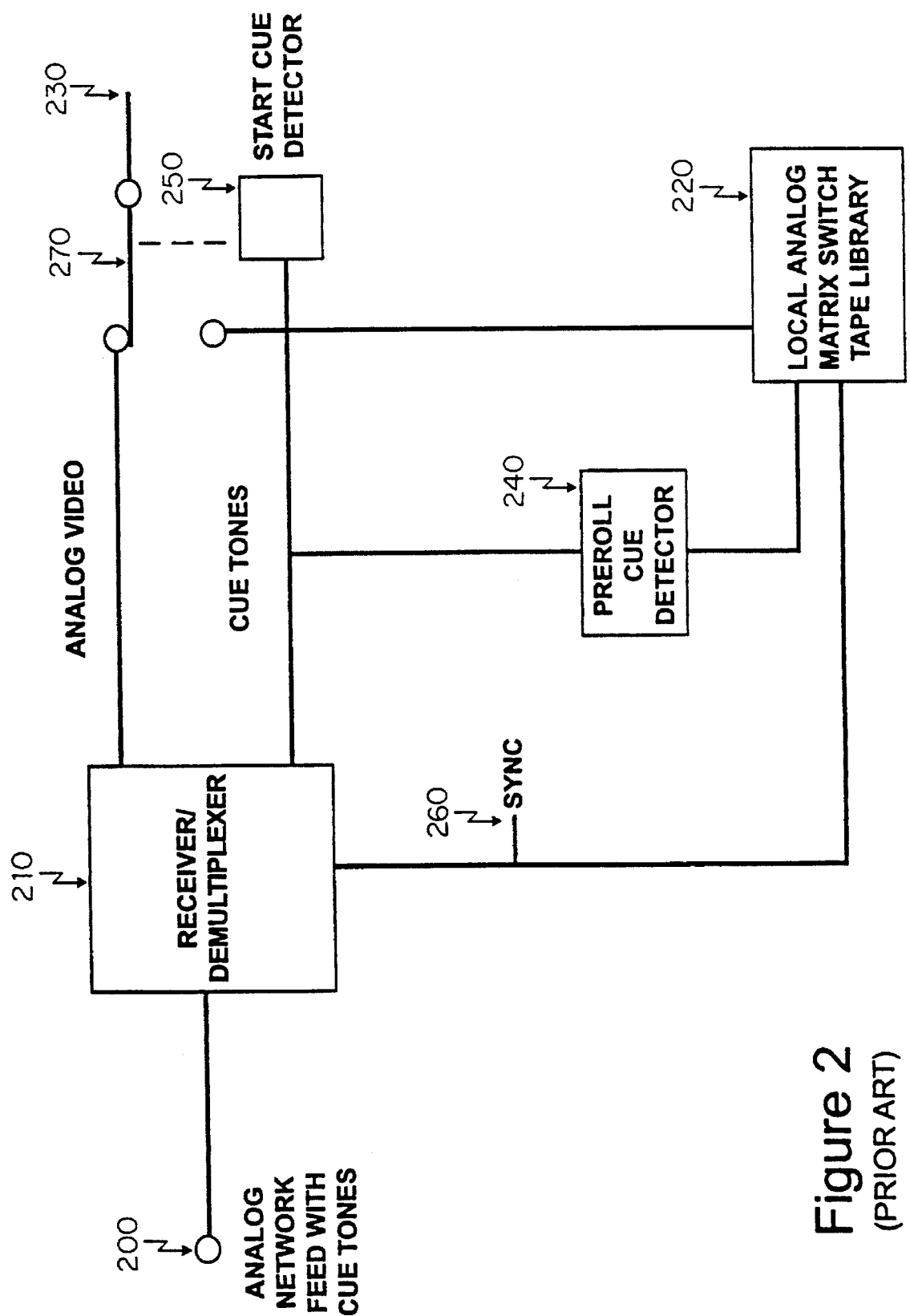
FIG. 2 is an illustration showing prior art analog ad insertion techniques.
Figure 3:
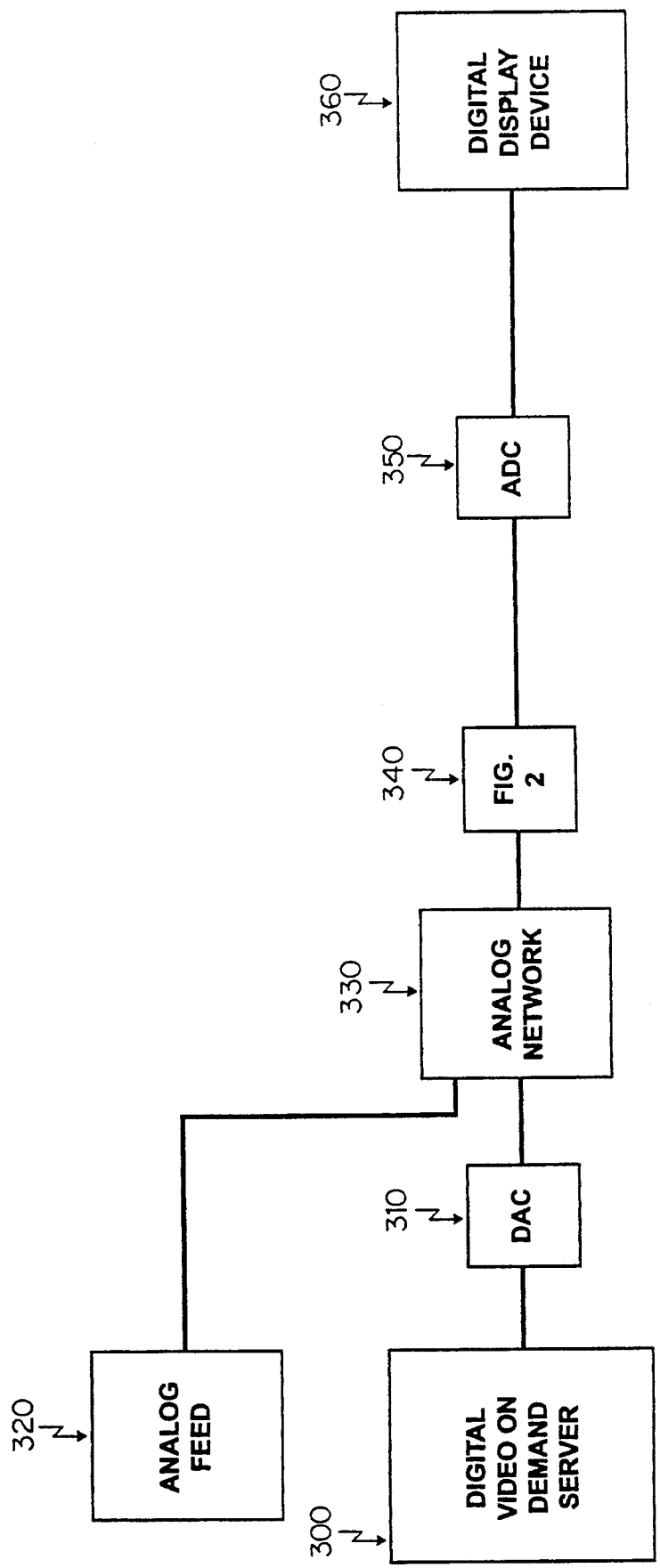
FIG. 3 is an illustration of end-to-end program distribution with ad insertion operating over an analog network as done in the prior art.
Figure 4:
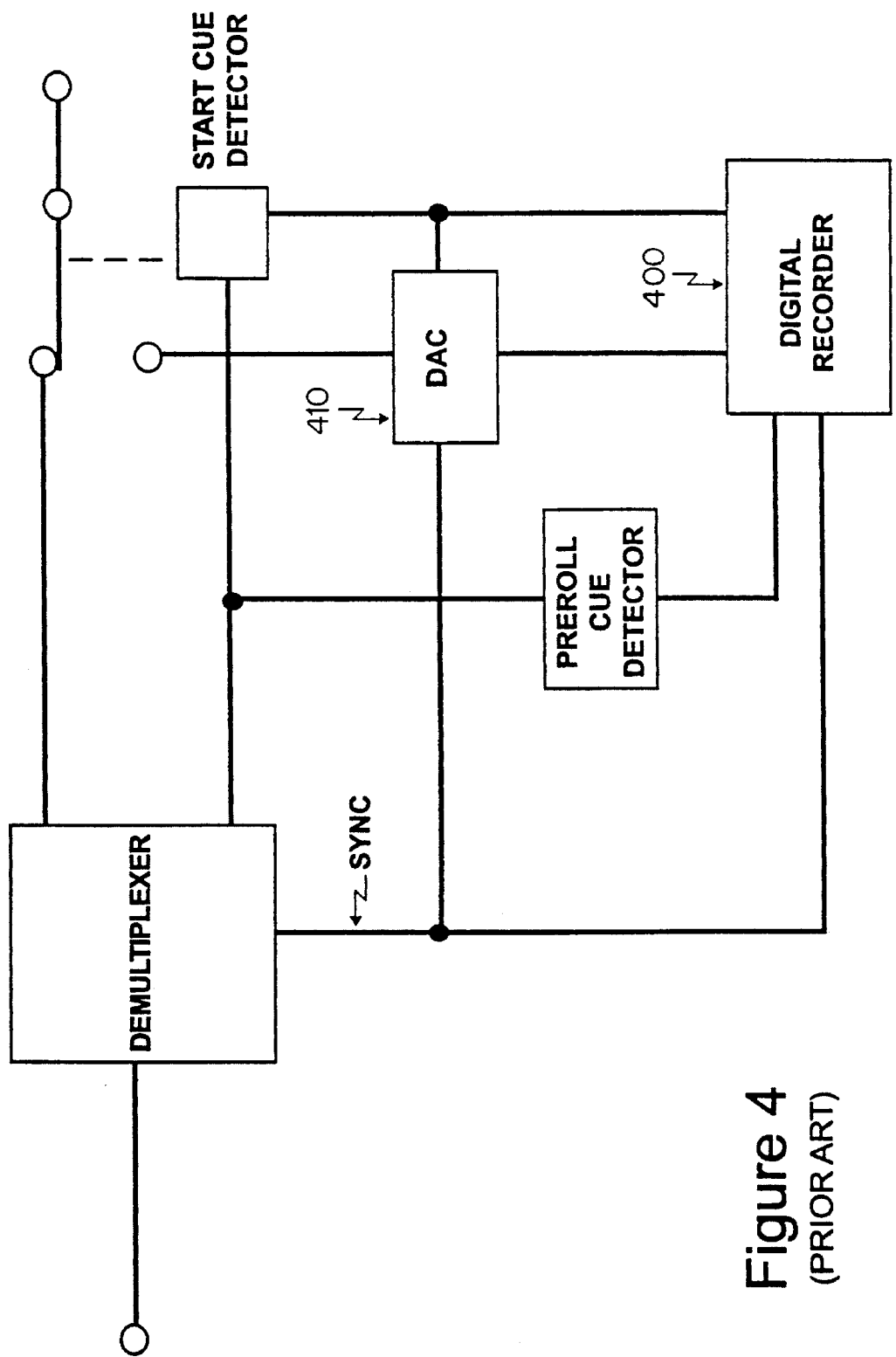
FIG. 4 is an illustration showing a prior art work around design to allow digital storage to be utilized.
Figure 5:
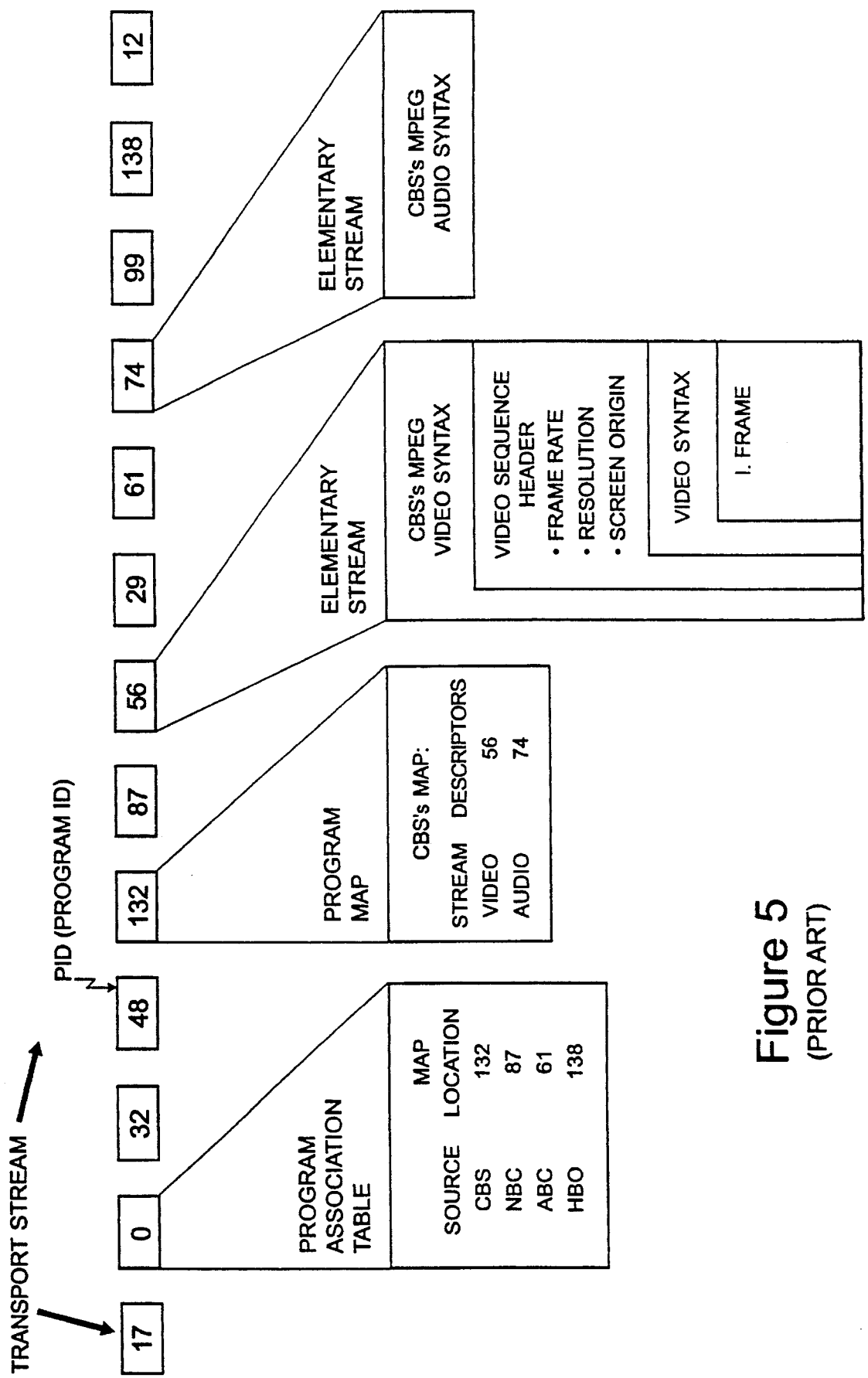
FIG. 5 is an illustration of an MPEG 2 transport stream of the prior art.
Figure 6:
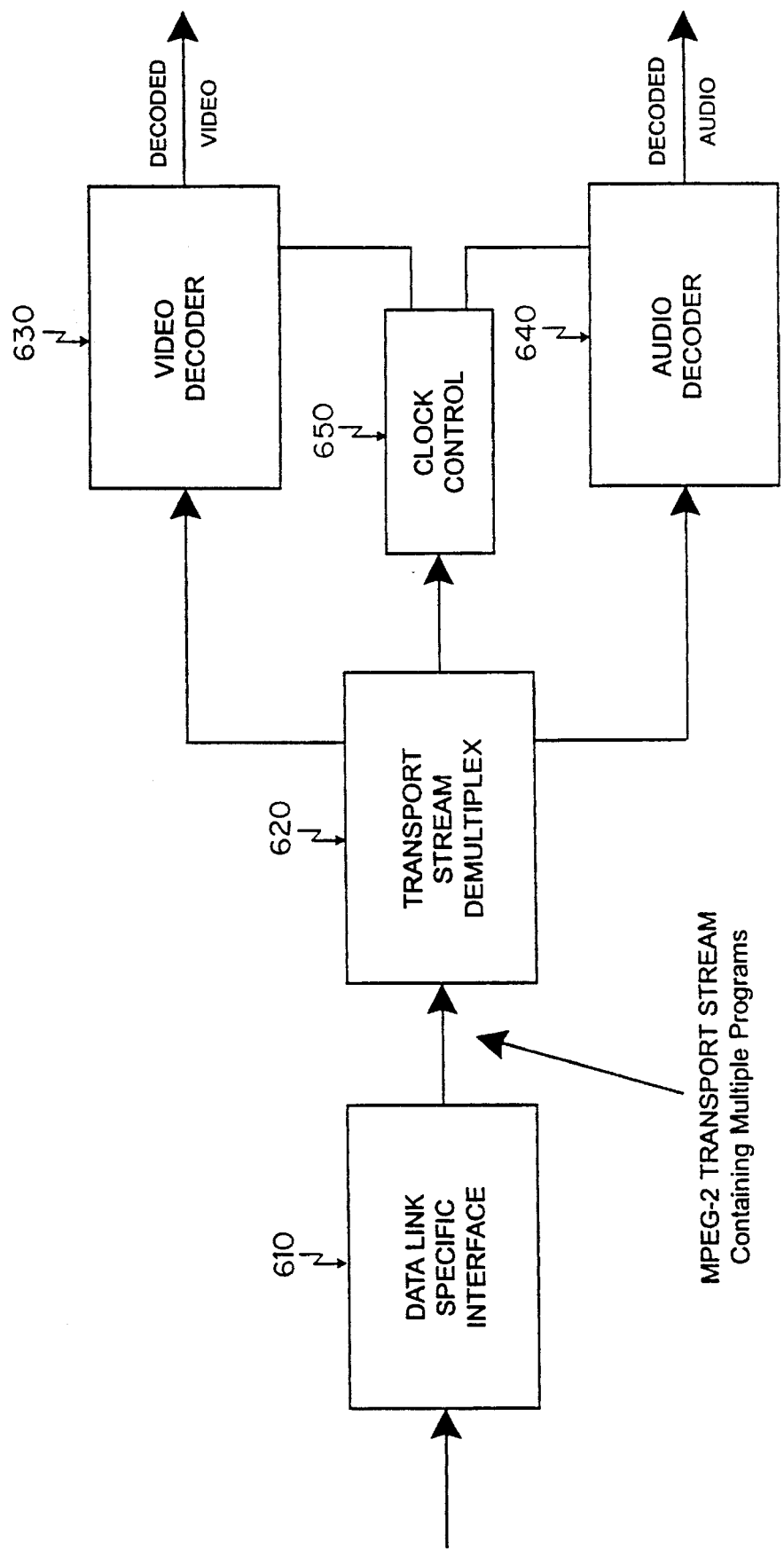
FIG. 6 is an illustration of an MPEG 2 decoder at a high level.
Figure 7:
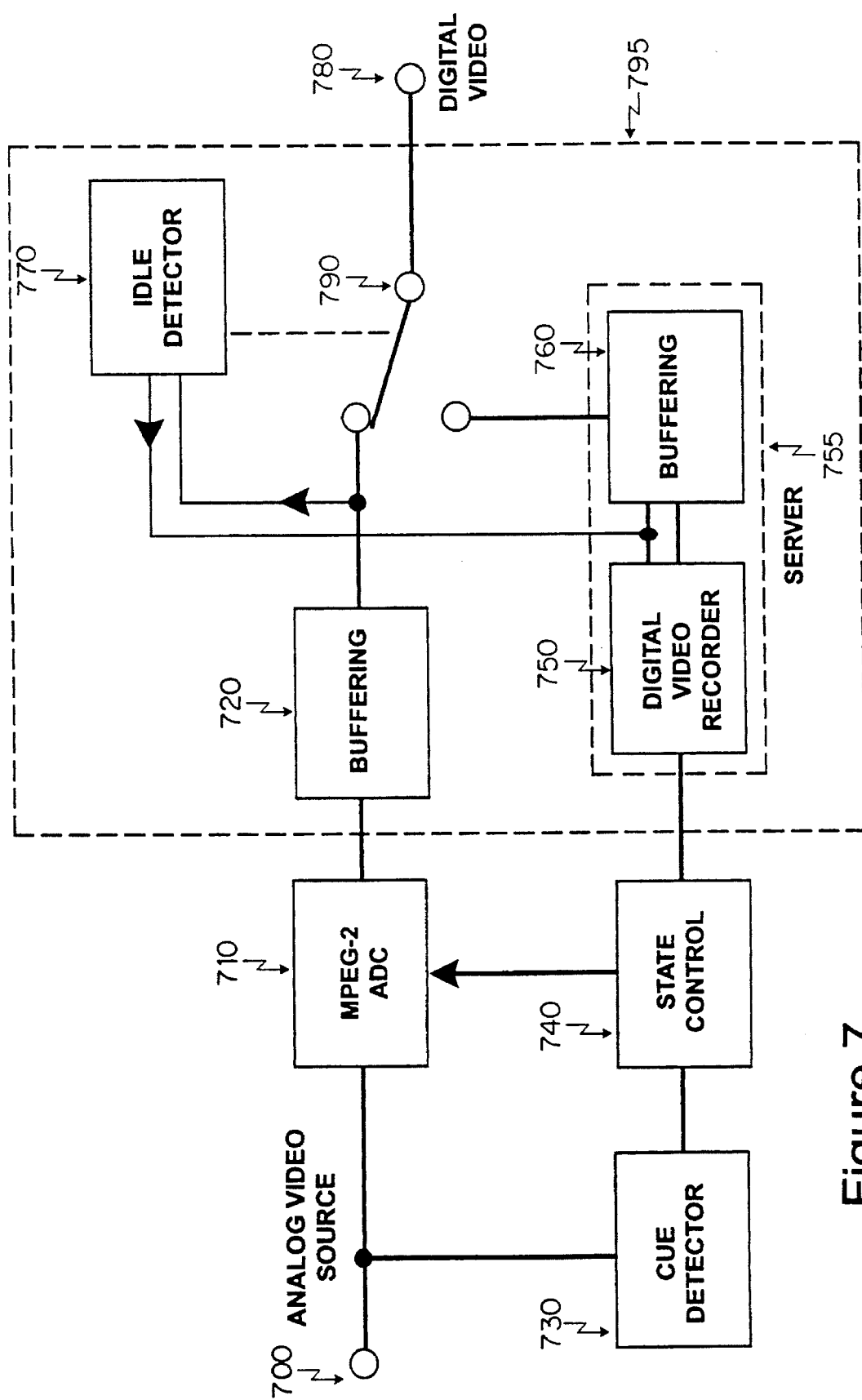
FIG. 7 illustrates a digital ad insertion technique according to the invention.

FIG. 7 illustrates a single channel embodiment of methods and apparatus for digital ad insertion in video programming.

Analog video source 700 receives programming from, for example, a network feed or a video on demand server. That analog video source is converted to digital in analog-to-MPEG-2 converter 710 and the output is buffered at 720 for transmission to users in digital over output port 780. Cue detector 730 detects cue tones from the video provider, which in most cases are network specific. State control 740 responds to cue detector 730 to trigger appropriate logical processing for MPEG-2 analog-to-digital converter 710 and digital video recorder 750, each with respective output buffering 720 and 760.

When the start-cue is received from the network and detected in cue detector 730, the video encoder 710 is signaled to complete its current frame. Note that since digital video output lags input by about 0.5–1.0 seconds, the last digitized frame should be the network's fade to black. When the server 755 is signalled by idle detection 770 that there is a lack of input, it begins to send advertising output to digital video output port 780.

Idle detection can be accomplished by either looking for an absence of packets addressed to a particular destination or by idle packets such as idle MPEG or ATM or TDM packets.

Shortly before the network break is over, the encoder 710 is signaled to restart. This request may be anticipated by the server which can tell approximately by the end of advertising content that a network feed will again be required. The encoder has start-up latency as it sends out its first encoded frame, but the server can always select its timing such that an underflow condition occurs. This eliminates the possible corruption of the MPEG stream which could result in decoder artifacts and instead shows a brief black screen before the channel feed from the network resumes. Thus, a black frame is preferably appended to each commercial produced for use on the system. Thus, by sending a substantially black frame as the last frame of digital information, an MPEG encoder will freeze the last frame of information until such time as good information is provided from a different source. Thus, when a black frame is sent as the last frame of the advertising, underflow occurs, the MPEG decoder freezes at a black frame and is thus ready to receive new information from the network feed.

Block 795 groups several functions together which are preferably implemented on a smart interface card, such as a smart protocol engine.

Figure 8:
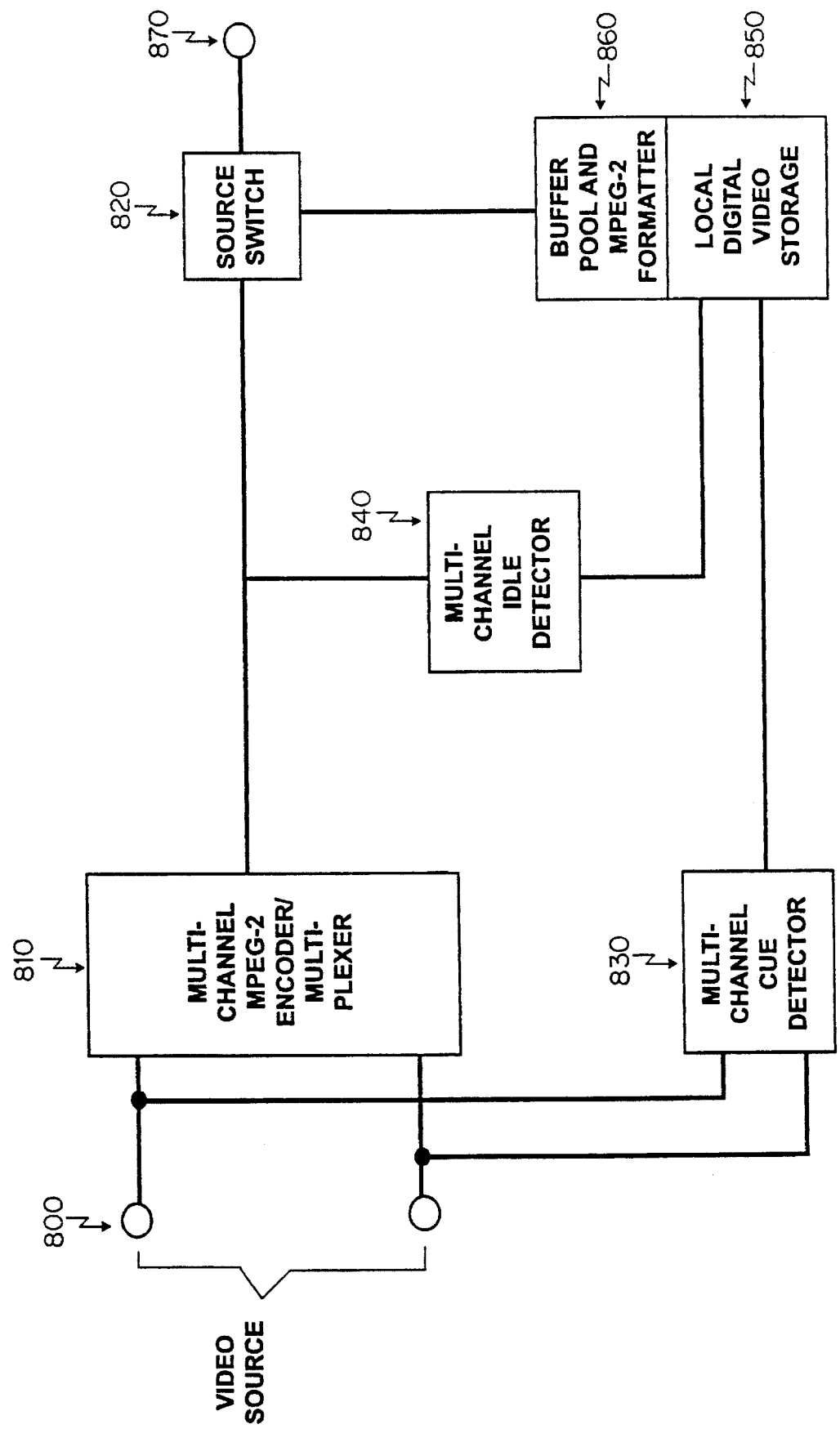
FIG. 8 is an illustration of a multi-channel digital ad insertion technique in accordance with the invention.

FIG. 8 is an illustration of multiple channel digital ad insertion techniques in accordance with a second embodiment of the invention.

A plurality of video sources 800 are connected to a multi-channel encoder/multiplexer such as an MPEG 2 or an ATM multiplexer 810. The digital output from multiplexer 810 is fed to source switch 820 which selects between the network feed coming through the video source 800 or the local advertising feed originating at local digital video storage 850 via Buffer Pool and MPEG Formatter 860. The selected output for a particular channel is fed to output port 870 for distribution by either an ATM switch or an MPEG capable decoder, depending upon the type of encoding.

The multiplexer may implement any number of multiplexing techniques. For example, each video source could be applied to a separate channel of a DS3 digital multiplex group. If that were the case, then source switch 820 would be a simple channel drop and insert facility for dropping out one channel of the DS3 composite and replacing it with information from local digital video storage 850.

Alternatively, multiplexer 810 could be one which multiplexes ATM packets into an OC-N fiber optic format for transmission to a destination. In such case, source switch 820 would be a simple, selectable packet filter which would substitute packets from local digital video storage 850 for those originating from multiplexer 810. Multi-channel cue detector 830 scans video sources 800 repeatedly to detect the presence of cue tones on each source.

Multi-channel idle detector 840 monitors, in the two examples previously given, either each time slot of a TDM composite stream to detect the presence of idle information in each channel or monitors ATM packets for the presence of idle information to be sent to a particular destination.

Figure 9:
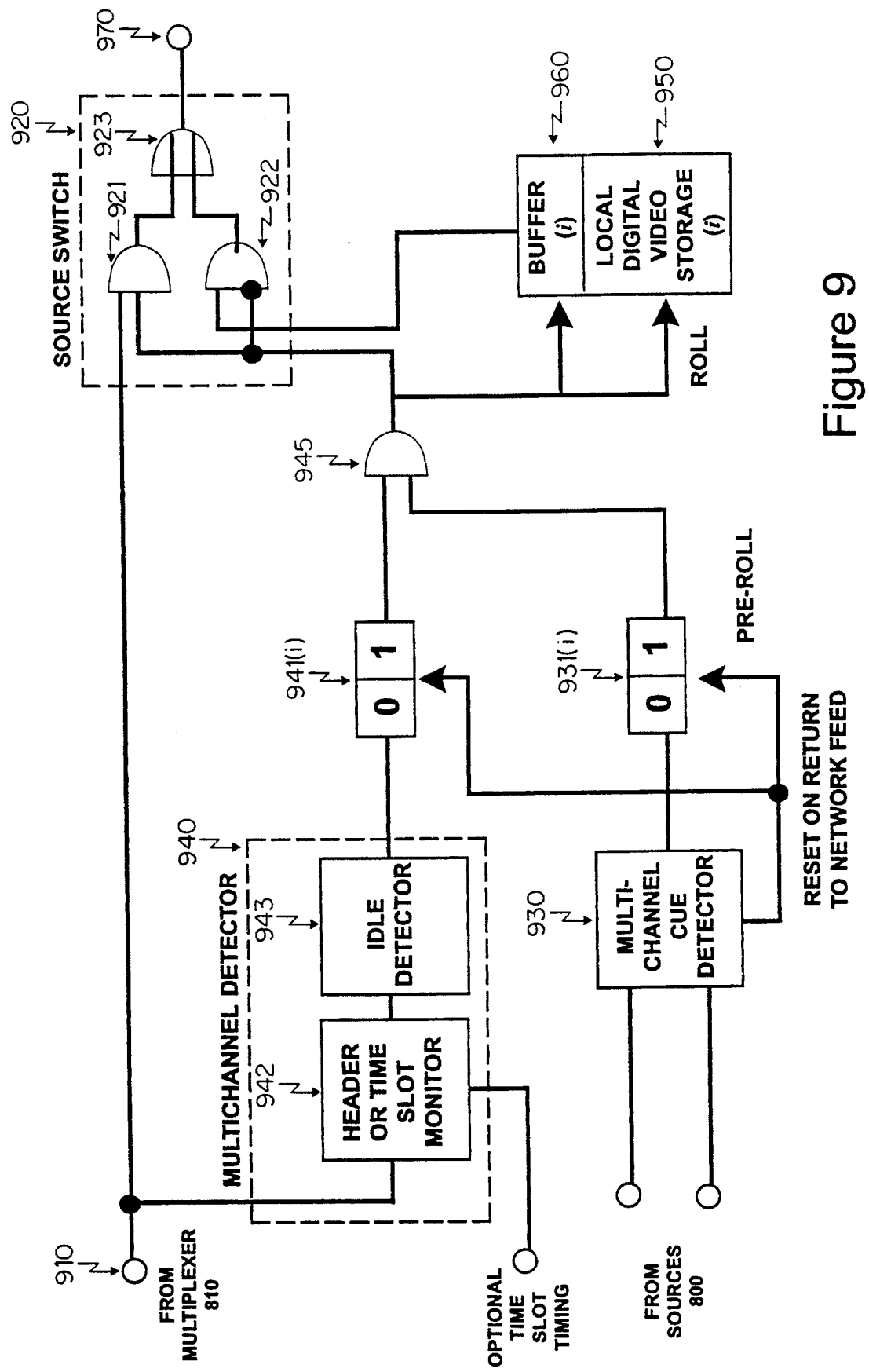
FIG. 9 is an illustration of some of the details of the FIG. 8 embodiment of the invention.

How the ad insertion is accomplished is discussed more in detail with reference to FIG. 9.

Multi-channel detector 940, multi-channel cue detector 930, source switch 920, local digital video storage 850, buffer pool, and MPEG 2 formatter 960 all correspond to items in FIG. 8 which have the same last two digits. Multiple channel video source information for multiplexer 810 arrives at input port 910 and is passed to header or time slot monitor 942 of the multi-channel detector 940. If a time slot oriented time division multiplexer is utilized, information will be extracted from a respective time slot at 942 and passed to idle detector 943 where the contents of the information extracted from the time slot is examined to determine the presence of idle data. If a series of idle time slots are detected having idle data, bi-stable 941 is set to a state such that 1 occurs on the output lead going to AND gate 945.

If an MPEG or ATM type multiplexer is utilized in which address information is used to separate channels, the packet headers will be decoded to determine the source or destination for the packets arriving from multiplexer 810. When a number of idle packets are detected from a particular source or for a particular destination, a bi-stable 941 is set to the ONE condition so that a logic 1 is applied to one input of AND gate 945. By monitoring time slots individually or by monitoring packet addresses by source address, one can detect when a particular channel goes idle.

Multichannel cue detector 930 can be implemented in several ways. As illustrated in FIG. 8, it can sample incoming lines repeatedly and detect from which line a pre-roll cue is received. When a pre-rolled cue is received for a particular line(i), a bi-stable 931(i) associated with that line can be set to 1 thus putting a logic 1 state on one input of AND gate 945 indicating that a pre-roll cue has been received for that particular channel. Later, when idle is detected, AND gate 945 has been pre-primed from the pre-roll cue and when idle is detected, bi-stable 941(i) is set to 1 and AND gate 945 is enabled thus triggering a switch of source from input multiplexer 810 to the local source 960 which carries the local advertising. Upon switchover, the output from the local source, is substituted for the channel information from multiplexer 810.

If multiplexer 810 is a time division multiplexer, then individual channels will be selected in synchronism with the incoming time division multiplex stream. Bi-stables 941(i) and 931(i) are provided for individual timeslots i. Source switch 920 would be switched synchronously depending on whether or not an alternate source of data were required to be inserted in a particular time slot.

In an environment in which MPEG is utilized for multiplexing, when alternate sources are required, there will be no direct packet-by-packet substitution. Rather, MPEG packets from multiplexer 810 from the source to be substituted will be blocked and the output of local digital video storage, in proper MPEG format will be worked into the digital stream where ever vacancies exist.

Bi-stables 931 and 941 can be implemented either as flags, as individual bits of a register, as individual bits of storage, or as individual flip flops for each channel being controlled.

In operation, when the pre-roll cue is received from a particular source 800, it is detected for that particular source and multi-channel cue detector 930 and the pre-roll bi-stable 931 is set thus priming AND gate 945 for a switch from network programming to local advertising. When multi-channel detector 940 detects that the source for multiplexer 810 has gone idle because the time for switching to local advertising has occurred, bi-stable 941 is set and AND gate 945 has both inputs in logic 1 condition thus activating the source switch 920 to divert to local digital video storage 950–960 which is an output on line 970 to the users.

By using the invention disclosed herein, the problems of the prior art are overcome. In this disclosure, there is shown and described only the preferred embodiment of the invention, but as aforementioned, it needs to be understood that the invention is capable of use in various other combinations and environments and is capable of change or modifications within the scope of the inventive concepts as expressed herein.

What is claimed is:

1. Apparatus for inserting local video programming in place of externally supplied programming comprising:

a. means for receiving externally supplied programming comprising analog video information and embedded tone cues including a pre-roll cue and a roll cue, detecting said tone cues and converting the analog video information to digital video information;

b. means for activating digital video storage in response to one of said tone cues preparatory to initiating playback; and c. means for initiating playback from said storage in response to detecting an idle condition from said digital video information.

2. The apparatus of claim 1 in which said digital video storage is a digital video recorder.

3. The apparatus of claim 1 in which the means for initiating playback from said storage in response to detecting an idle condition from said digital video information includes detecting an idle condition by detecting idle MPEG packets.

4. The apparatus of claim 1 in which said means for initiating playback from said storage in response to detecting an idle condition from said digital video information comprises an output buffer filled in response to one of said tone cues and read out in response to said detecting an idle condition.

5. The apparatus of claim 1 in which the means for initiating playback from said storage in response to detecting an idle condition from said digital video information comprises means for monitoring at least one time slot of a time division multiplexed signal and substituting local programming information from said recorder into said at least one time slot when an idle condition is detected.

6. The apparatus of claim 1 in which the means for initiating playback from said storage in response to detecting an idle condition from said digital video information comprises means for monitoring packet headers for particular source addresses and sending local programming information from said recorder when packets having a particular source address indicate an idle condition.

7. The apparatus of claim 1 in which the means for initiating playback from said storage in response to detecting an idle condition from said digital video information comprises means for monitoring MPEG packet headers for particular destination addresses and sending local programming information from said recorder when packets having a particular destination address indicate an idle condition.

8. The apparatus of claim 1 in which the means for initiating playback from said storage in response to detecting an idle condition from said digital video information comprises means for monitoring MPEG packet headers for particular destination addresses and sending local programming information from said recorder when no packets having a particular destination address arrive.

9. The apparatus of claim 1 in which means for initiating playback from said storage in response to detecting an idle condition from said digital video information begins playback at a point in a video frame which is the same as a point at which the information from the externally supplied programming left off.

10. The apparatus of claim 9 in which said point in a video frame is a frame boundary.

11. The apparatus of claim 9 in which said point in a video frame is a packet boundary.

12. Apparatus for inserting local video programming in place of externally supplied programming comprising:

a. means for receiving externally supplied programming from a plurality of sources, each source providing programming comprising analog video information and embedded tone cues, and for converting the analog video information to digital video information;

b. storage means for storing a plurality of local programs;

c. common means for monitoring all of said sources to detect one or more tone cues from a source and for preparing said storage means for playback of respective one or more of said local programs to be substituted for said externally supplied programming from a source sending at least one of said one or more tone cues; and d. means for initiating playback from said storage means of respective one or more of said local programs to be substituted for said externally supplied programming from a source in response to detecting an idle condition from said digital video information of said source.

13. The apparatus of claim 12 in which the storage means includes a plurality of buffers and means for allocating said plurality of buffers to provide said one or more local programs to replace externally supplied programming from individual sources.

14. The apparatus of claim 12 in which said means for monitoring implements a plurality of cue tone protocols provided by respective ones of said plurality of sources.

15. The apparatus of claim 12 in which the means for initiating playback begins playback at a point in a video frame which is the same as a point at which the information from the externally supplied programming left off.

16. The apparatus of claim 12 in which said point in a video frame is a frame boundary.

17. The apparatus of claim 12 in which said point in a video frame is a packet boundary.

18. The apparatus of claim 12 in which the idle condition is detected by detecting idle MPEG or ATM packets and the means for initiating playback begins playback at a frame boundary.

19. The apparatus of claim 12 in which the idle condition is detected by detecting idle MPEG packets and the means for initiating playback begins playback at a packet boundary.

20. A method for inserting local video programming in place of externally supplied programming comprising:
   a. receiving externally supplied programming comprising analog video information and embedded tone cues including a pre-roll cue and a roll cue, detecting said tone cues and converting the analog video information to digital video information;
   b. activating video storage in response to one of said tone cues preparatory to initiating playback; and
   c. initiating playback from said recorder in response to detecting an idle condition from said digital video information.

21. A method according to claim 20 in which the step of activating video storage in response to one of said tone cues preparatory to initiating playback comprises placing a recorder in a state ready to playback and filling a buffer with data.

22. A method according to claim 20 in which the step of activating a video storage in response to one of said tone cues preparatory to initiating playback comprises calculating an estimated time from roll cue detection to end of a current frame; and pre-filling a buffer with an amount of data from a recorder; and reading out data from said buffer at said estimated time.

23. A method according to claim 20 in which the step of activating video storage in response to one of said tone cues preparatory to initiating playback comprises calculating an estimated time from roll cue detection to end of a current packet; and pre-filling a buffer with an amount of data from said recorder.

24. A method for inserting externally supplied programming in place of local video programming comprising:
   a. receiving local digital video programming and providing it to a user;
   b. receiving externally supplied analog video programming and embedded tone cues including a return to network cue,
   c. detecting said return to network cue;
   d. converting said analog video programming to digital video information upon receipt of said return to network cue; and
   e. terminating operation of video storage in response to detection of an idle condition in said local digital video programming.

25. A method for inserting local video programming in place of externally supplied programming comprising:
   a. receiving externally supplied programming from a plurality of sources, each source providing programming comprising analog video information and embedded tone cues, and for converting the analog video information to digital video information;
   b. a memory for storing a plurality of local programs;
   c. monitoring each of said sources to detect one or more tone cues for preparing said memory for playback of respective one or more of said local programs to be substituted for said externally supplied programming; and
   d. initiating playback from said memory of respective one or more of said local programs to be substituted for said externally supplied programming from a source when a respective source is determined to be idle.

* * * * *